United States Patent

Hlava

[11] Patent Number: 5,285,984
[45] Date of Patent: Feb. 15, 1994

[54] STRUCTURE FOR CONFINING THRUST WASHERS ON FISHING REELS

[75] Inventor: Lorens G. Hlava, Clinton, Mo.

[73] Assignee: Zebco Corporation, Tulsa, Okla.

[21] Appl. No.: 741,033

[22] Filed: Aug. 6, 1991

[51] Int. Cl.⁵ .............................................. A01K 89/01
[52] U.S. Cl. ................................... 242/239; 242/321; 384/426
[58] Field of Search ............... 242/234, 235, 236, 237, 242/238, 239, 240, 321; 384/426

[56] References Cited

U.S. PATENT DOCUMENTS

| | | | |
|---|---|---|---|
| 3,034,741 | 5/1962 | Macy et al. | 242/240 |
| 3,114,514 | 12/1963 | Clark | 242/240 |
| 3,146,965 | 9/1964 | Khazzam | 242/240 |
| 3,223,346 | 12/1965 | Fowler | 242/239 |
| 3,298,628 | 1/1967 | Harrington et al. | 242/239 |
| 3,329,371 | 7/1967 | Willis et al. | 242/239 |
| 4,859,088 | 8/1989 | Fer | 384/426 |

FOREIGN PATENT DOCUMENTS 820874 9/1959 United Kingdom ............... 242/240

Primary Examiner—Joseph J. Hail, III
Attorney, Agent, or Firm—Wood, Phillips, VanSanten, Hoffman & Ertel

[57] ABSTRACT

A fishing reel of the type having a deck plate and a center shaft extending forwardly through the deck plate. The center shaft is rotatable about a first axis. A pinion gear is mounted on the center shaft. A crank shaft is rotatable about a second axis transverse to the first axis. Structure is provided for rotating the center shaft about the first axis as an incident of the crank shaft rotating about the second axis. A washer surrounds the center shaft and resides between the pinion gear and the deck plate, the washer having a peripheral outer edge. Structure is provided on the deck plate radially outside of the center shaft and overlapping at least a part of the washer in a lengthwise direction relative to the center shaft for limiting shifting of the washer transverse to the first axis and thereby preventing interference between the washer and at least one of the center shaft and pinion gear during operation of the reel.

8 Claims, 2 Drawing Sheets

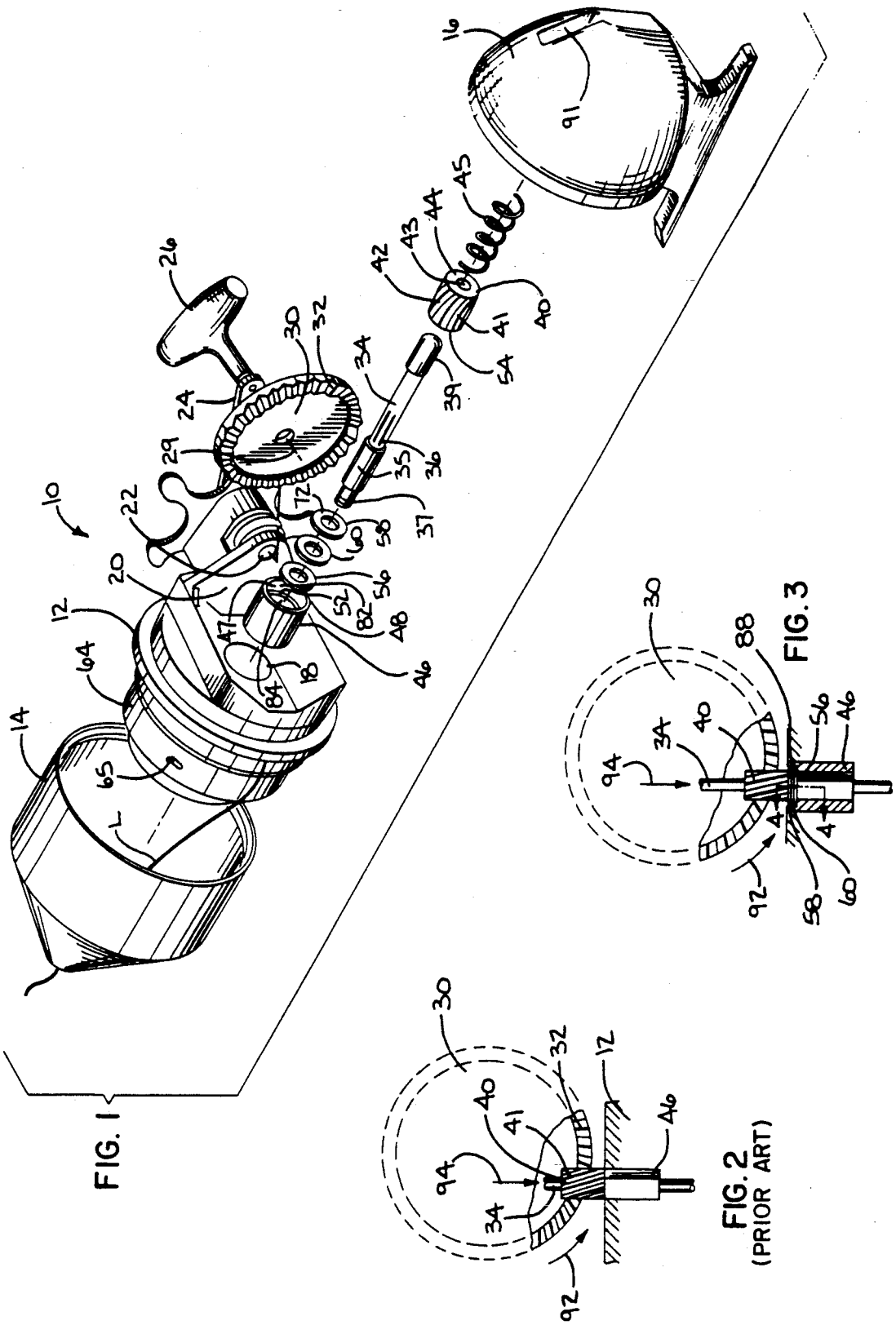

STRUCTURE FOR CONFINING THRUST WASHERS ON FISHING REELS

BACKGROUND OF THE INVENTION

1. Technical Field

The present invention is directed toward fishing reels and more particularly toward a thrust washer system and structure for confining the thrust washer system for fishing reels.

2. Background Art

In one type of closed-faced spin cast fishing reel, a reel frame or deck plate has an axial bore for receiving a center shaft. Formed integral with the center shaft or splined thereon is a pinion gear having helical teeth. When the center shaft is disposed within the bore of the deck plate the pinion gear extends rearwardly from the deck plate. The reel further includes a face gear cooperatively interengaging the pinion gear. Attached to the drive gear is a drive shaft which in turn is attached to a crank handle. When the crank handle is rotated in a line retrieving direction the drive gear is rotated, which in turn causes rotation of the pinion gear and the center shaft associated therewith. Because of the helical angle of the pinion gear teeth, the pinion gear is axially thrust forward against the deck plate when the pinion gear is caused to rotate in a line retrieving direction. In addition, the drive gear causes a radial loading on the center shaft when the drive gear rotates the center shaft.

Many reels seat a conventional ball bearing at the rearward portion of the deck plate to dissipate the frictional resistance to rotation of the center shaft caused by the forward thrust (or axial load) of the pinion gear and the radial load of the drive gear discussed above. However, such ball bearings are expensive, not readily available in small sizes required by fishing reels and hard to turn if grease used on the reel gears seeps into the ball area. Moreover, while these ball bearings are effective in alleviating radial frictional forces opposing rotation of the center shaft, they are not very effective in dissipating axial frictional forces caused by the forward thrust of the pinion gear, as for example when the center shaft is caused to turn in a line retrieving direction. In particular, conventional ball bearings do not hold up for long periods of time under the repeated forward thrust of the pinion gear.

As an alternative to conventional ball bearings, some reels used an angular contact bearing. Angular contact bearings are designed to stand up to the axial forward thrust of the pinion gear. However, angular contact bearings generally are more expensive than conventional ball bearings and are inferior to conventional ball bearings for facilitating rotation of the center shaft under radial loads.

Another device used in the art for facilitating rotation of the center shaft under axial and radial loads is an OILITE TM bushing inserted into the bore in the deck plate, the OILITE TM bushing having a center shaft receiving bore therein. As is readily appreciated by those skilled in the art, OILITE TM bushings are typically made of a porous brass or bronze alloy with a lubricant such as oil permeated into the pores of the bushing. When heat is generated such as by rotation of the center shaft within the OILITE TM bushing, lubrication is released from the pores of the bushing. Use of an OILITE TM bushing to facilitate rotation of the center shaft in the deck plate is often preferred over conventional ball bearings and angular contact bearings because it is less expensive and often times more durable.

When a pinion gear having helical teeth is rotated in a line retrieving direction, thereby subjecting the OILITE TM bushing to a forward thrust, lubrication seeps from the pores of the rearward facing edge of the OILITE TM bushing to facilitate easy rotation of the pinion gear and associated center shaft. However, under heavy and sustained forward thrusts, such as when a large fish is being reeled in, excessive heat and friction can cause the surface of the OILITE TM bushing contacting pinion gear to be depleted of lubrication, thus increasing the coefficient of friction between the OILITE TM bushing and the pinion gear and causing binding between the OILITE TM bushing and the pinion gear. Besides making line retrieval more difficult, this binding increases the wear on the reel drive system, in particular, the wear between the pinion gear and drive gear.

SUMMARY OF THE INVENTION

The present invention facilitates utilization of OILITE TM bushings in fishing reels having pinion gears with helical teeth, thereby promoting the many advantages of such bushings, while at the same time eliminating the excessive friction between the pinion gear and the OILITE TM bushing and the associated gear wear and reel binding. Moreover, the present invention provides a structure for confining the thrust washers which provide these advantages in a proper position relative to the deck plate and the center shaft.

The present invention is an improvement in a fishing reel of the type having a deck plate, a center shaft extending forwardly through the deck plate, the center shaft being rotatable about a first axis. The fishing reel further includes a pinion gear on the center shaft and a crank shaft rotatable about a second axis transverse to the first axis. Structure is provided for rotating the center shaft about the first axis as an incident of the crank shaft rotating about the second axis. The improvement is a washer having a bore for the center shaft, surrounding the center shaft and residing between the pinion gear and the deck plate. A limiting structure is provided on the deck plate radially outside of the center shaft opening in the washer and overlapping at least a part of the washer in a lengthwise direction relative to the center shaft for limiting shifting of the washer transverse to the first axis and thereby preventing interference between the pinion gear and the center shaft during operation of the reel.

The washer has a radially inwardly facing edge defining a bore to accept the center shaft and is abuttable to the pinion gear and the center shaft has a rearwardly facing surface/shoulder defined by an enlarged portion of the center shaft. The center shaft shoulder and outer surface of the enlarged portion of the center shaft define a corner. The limiting structure prevents the washer from shifting so that the edge is radially beyond the corner on the center shaft, so as to prevent interference between the washer and the center shaft.

The limiting structure of the fishing reel may be defined by a bushing that is integral with or separately attachable to on the deck plate. More particularly, the bushing may have a stepped inner surface having a greater diameter portion and a lesser diameter portion. The lesser diameter portion defines a center shaft abutting forward portion and the greater portion defines a peripheral outer edge of the washer abutting rearward portion.

The thrust washer structure of the present invention facilitates the use of an OILITE TM bushing in place of costly and delicate conventional or angular contact ball bearings. By placing the thrust washer structure between an OILITE TM bushing and a pinion gear having helical teeth on a center shaft of a fishing reel, the many advantages of the OILITE TM bushing may be enjoyed without causing excessive friction between the pinion gear and the OILITE TM bushing which can lead to binding between the OILITE TM bushing and the pinion gear and excessive reel gear wear and eventual premature failure of the reel. Moreover, the present invention provides a structure for limiting radial movement of the thrust washer structure, thereby preventing interference between the thrust washer structure and the pinion gear and/or center shaft during operation of the reel.

DESCRIPTIONS OF THE DRAWINGS

FIG. 1 is an exploded, perspective view of a closed-face spinning reel including thrust washers and limiting/confining structures therefore according to the present invention;

FIG. 2 is a side elevation view illustrating the prior art use of an OILITE TM bushing between a reel deck plate and a pinion gear on a center shaft and having helical teeth thereon;

FIG. 3 is a side elevation view illustrating the thrust washers and limiting/confining structure therefore according to the present invention disposed between the pinion gear and an OILITE TM bushing;

DETAILED DESCRIPTION OF THE PREFERRED EMBODIMENT

Figure 4:
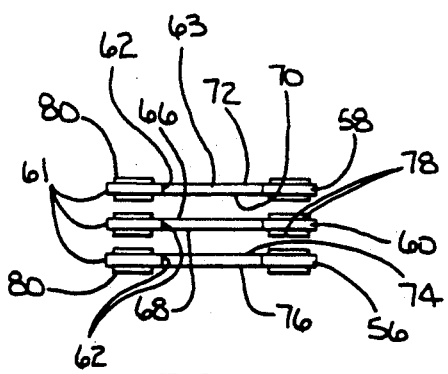
FIG. 4 is an exploded elevation view of the thrust washers taken along line 4—4 of FIG. 3.

A fishing reel 10 includes a cylindrical reel frame body or deck plate 12. The deck plate 12 is captively held between a threadably engaged cup-shaped front cover 14 and a cup-shaped back cover 16. The deck plate 12 has an axial cylindrical bore 18 extending therethrough. An integral boss 20 extends rearwardly from the deck plate 12. The integral boss 20 has a drive shaft bore 22 therethrough.

The reel 10 has a drive mechanism including a crank handle 24. A crank knob 26 is rotatably attached to one end of the crank handle 24. The other end of the crank handle 24 is connected to a drive shaft (not shown) defining an axis 29. The drive shaft extends through the drive shaft bore 22 and axially engages a face gear 30. The drive gear 30 has axially projecting teeth 32.

The drive mechanism further includes a center shaft 34. The center shaft 34 includes a radially enlarged portion 35 and a keying portion 36. A threaded end 37 is located on a forwardly facing end of the center shaft 34. The shaft is mounted about an axis 38 transverse the axis 29. An enlarged head 39 is provided at the other end of the center shaft 34.

A pinion gear 40 has helical teeth 41 on a radially outwardly facing surface 42 and an axial bore 43 having a cooperative cross section for making keyed connection with the keying portion 36 of the center shaft 34 to prevent relative rotation therebetween. The pinion gear 40 is splined on the keying portion 36 of the center shaft 34. Or, alternatively, the pinion gear 40 may be integrally formed on the center shaft 34. When the center shaft 34 is seated in the axial bore 18 of the deck plate 12, the helical teeth 41 of the pinion gear 40 cooperatively interengage the axially projecting teeth 32 of the drive gear 30.

Between a rearwardly facing surface 44 of the pinion gear 40 and the enlarged head 39 of the center shaft 34 is mounted a spring 45.

The center shaft 34 is axially inserted into the bushing 46 having a radially inwardly facing surface 47 defining an axial cylindrical bore 48 therein. Preferably, the bushing 46 is an OILITE TM bushing. The OILITE TM bushing 46 is nested in the cylindrical bore 18 of the deck plate 12. Located between a rearwardly facing surface 52 of the OILITE TM bushing 46 and a forwardly facing surface 54 of the pinion gear 34 are three thrust washers including end thrust washers 56, 58 and a middle thrust washer 60. Each thrust washer 56,58,60 has a peripheral outer edge 61 and radially inwardly facing edge 62 defining a bore 63 (see FIG. 4).

Threadably engaged to the threaded end 37 of the center shaft 34 is a spinner head 64. The spinner head 64 includes a retractable pickup pin 65 which holds the line L on the spinner head 64 to cause the spinner 64 to wrap line onto a spool (not shown).

FIG. 1 illustrates a preferred embodiment of the thrust washer structure of the present invention wherein three thrust washers are disposed between the rearwardly facing surface 52 of the OILITE TM bushing 46 and a forwardly facing surface 54 of the pinion gear 40. The present invention also contemplates the use of any number of thrust washers of one or greater. The thrust washers dissipate frictional forces caused by a forward thrust of the pinion gear 40.

As best seen in FIG. 4, the middle thrust washer 60 has two axially facing surfaces 66, 68. The end thrust washer 58 has an inner axially facing surface 70 and an outer axially facing surface 72. Similarly, the end washer 56 has an inner axially facing surface 74 and an outer axially facing surface 76. As is readily apparent, the inner axially facing surface 70 of the end thrust washer 58 contacts the axially facing surface 66 of the middle thrust washer 60 and the inner axially facing surface 74 of the end thrust washer 56 contacts the other axially facing surface 68 of the middle thrust washer 60 defining a pair of interfaces. The outer axially facing surface 72 of the end thrust washer 58 contacts the forwardly facing surface 54 of the helical pinion gear 40 and the outer axial surface 76 of the end radial washer 56 contacts the rearwardly facing surface 52 of the OILITE TM bushing 46.

In a highly preferred embodiment of the present invention, the thrust washers 56, 58, 60 are made of a hardened steel such as a spring steel. Stainless steel has also been found effective, but not as effective as a hardened spring steel. A beryllium copper alloy may also yield satisfactory results.

The middle washer 60 may be made of plastic. Any plastic having high lubricity and low wear characteristics may be used. Examples of plastics which should function acceptably include nylon, VESPEL TM, DURACON TM and DELRIN TM. A thrust washer structure wherein each of the washers are made of such plastics is also within the scope of the present invention.

Figure 5:
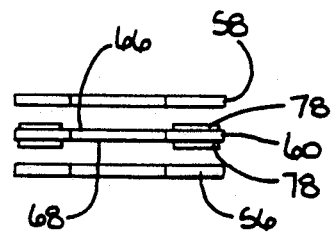
FIG. 5 is an exploded cross-sectional view of an alternative embodiment of the thrust washers taken along line 4—4 of FIG. 3.

Another preferred embodiment of the present invention contemplates the use of an antifriction coating 78 between the axially facing surfaces 66, 68 of the middle thrust washer 60 and the inner axially facing surfaces 70, 74 of the end thrust washers 58, 56 respectively. As illustrated in FIG. 4, the antifriction coating 78 may be applied on the axially facing surfaces 66, 68 of the middle thrust washer 60 and the inner axially facing surfaces 70, 74 of the end thrust washers 58, 60 respectively. The invention also contemplates the antifriction coating being only on the axially facing surfaces 66, 68 of the middle thrust washer 60 (see FIG. 5). The antifriction coating 78 may take forms, including TEFLON TM, silicone or molybedimum disulfide.

The present invention also contemplates a structure for increasing the coefficient of friction of the outer axially facing surfaces 72, 76 of the end thrust washers 58, 56 respectively. For example, as illustrated in FIG. 4, the outer axially facing surfaces 72, 76 of the end thrust washer 58, 56 may be roughened as shown at 80. Adhering the outer axially facing surface 72 of the end thrust washer 58 to the forwardly facing surface 54 of the pinion gear 40 and adhering the outer axially facing surface 76 of the end thrust washer 56 to the rearwardly facing end 52 of the OILITE TM bushing 46 by gluing, staking or some other structure is also within the scope of the present invention.

Any combination of roughening the outer axial surfaces 72, 76 of the end thrust washers 58, 56, applying an antifriction coating to the interface defined by the inner axially facing surfaces 70, 74 of the end thrust washers 58, 56 and the axially facing surfaces 66, 68 middle thrust washer 60 or thrust washer materials may be employed, the desired result being to assure that the coefficient of friction between the middle thrust washer 60 and the end thrust washers 58 is less than the coefficient of friction between the end thrust washer 58 and the rearwardly facing surface 52 of the OILITE TM bushing 46. It is also desirable that the coefficient of friction between the outer axially facing surface 76 of the end thrust washer 56 and the forwardly facing surface 54 of the pinion gear 40 is greater than coefficient of friction between the middle thrust washer 60 and the end thrust washer 56.

Figure 8:
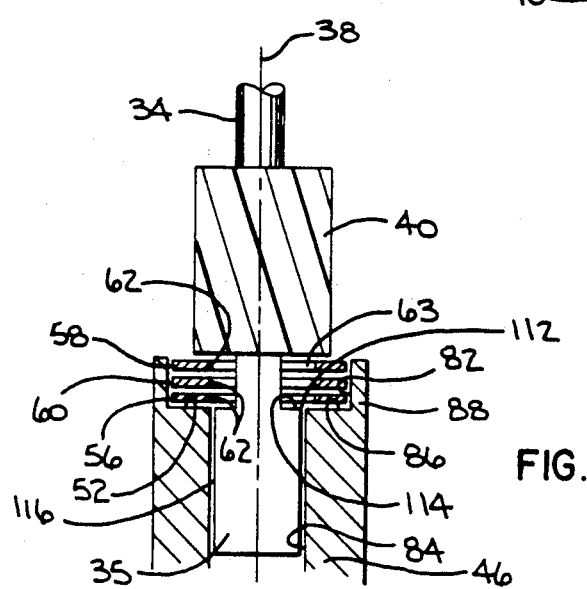
FIG. 8 is a cross-sectional view illustrating the thrust washers in combination with the limiting/confining structure of the present invention and taken along line 6—6 of FIG. 3.

The present invention further contemplates a limiting structure on the deck plate for preventing the washers 56,58,60 from shifting on the center shaft 34 and thereby interfering with either the center shaft 34 or the pinion gear 40 during reel 10 operation. Preferably, the limiting structure is a bushing 46 having a stepped axial bore 48 in the bushing 46. More particularly, the bushing 46 has an inner surface 47 having a greater diameter portion 82 and a lesser diameter portion 84. As best seen in FIG. 8, a step 86 between the greater diameter portion 82 and the lesser diameter portion 84 forms a surface upon which the thrust washers 56,58,60 are supported. The larger diameter portion 82 is defined by a radial lip 88 around the periphery of the bushing 46, the radial lip 88 further defining the rearwardly facing edge 52 of the bushing 46.

Briefly, the operation of the fishing reel 10 can be described as follows. The center shaft 34 is biased rearwardly by the spring 45. Depression of a thumb button 90 by a user pushes the center shaft 34 forward relative to the deck plate 12. The spinner head 64 attached to the forward threaded end 37 of the center shaft 34 is thereby pushed forward against an inside rearwardly facing surface on the front cover 14. Line L is then trapped between the spinner head and the front cover 14 to prevent the line L from being paid out from the line spool (not shown). Forward displacement of the spinner head 66 also causes the pick-up pin 65, which normally projects radially through the spinner head 64, to be withdrawn to thereby allow the line L to freely uncoil from the spool. When the line L is to be cast forward, the user releases the thumb button 90, causing the spinner head 64 to move rearwardly relative to the front cover 14 by action of the spring 45, thereby allowing the line L to be paid out from the line spool. After the line L has been paid out, the user rotates the handle in a line retrieving direction which causes the pick-up 65 pin on the spinner head 64 to project through the spinner head 64 to thereby pick up the line L.

Retrieval of the line L is effected by continuous rotating of the center shaft 34 by means of the crank handle 24. More particularly, rotating the crank knob 26 rotates the crank handle 24 which in turn rotates the drive shaft (not shown). The drive shaft in turn causes rotation of the drive gear 30. The axially projecting teeth 32 of the drive gear 30 cooperatively engage the helical teeth 41 of the pinion gear 40, causing the pinion gear 40 to rotate which rotates the center shaft 34 which in turn rotates the spinner head 64. Rotating the spinner head 64 in the line retrieving direction causes the pick-up pin 65 to wind the line L onto the line spool.

As seen in FIGS. 2 and 3, during rotation of the drive gear 30 in the line retrieving direction 92, the helical angle of the helical teeth 41 of the pinion gear 40 causes a forward thrust 94 of the pinion gear 40 against the deck plate 12. In the prior art illustrated in FIG. 2, this forward thrust is directly opposed by the rearwardly facing surface 52 of the OILITE TM bushing 46. During prolonged periods of line retrieval, such as when line is being retrieved to recover a fish, excessive heat is generated by frictional forces caused by the forward thrust of the pinion gear 40 against the rearwardly facing edge 52 of the OILITE TM bushing 46 and the rotation of the pinion gear 40. Eventually, this excessive heat leads to depletion of the lubricant permeated into the OILITE TM bushing 46 around the rearwardly facing surface 52 of the OILITE TM bushing 46 which increases coefficient of friction between the OILITE TM bushing 46 and the pinion gear 40. The resultant increased frictional resistance to rotation of the center shaft 34 leads to binding of the reel 10, excessive wear on the gear teeth 41, 32 and eventual failure of the reel 10.

The thrust washers 56,58,60 of the present invention maintain a low coefficient of friction between the pinion gear 40 and the OILITE TM bushing 46 and thereby dissipate frictional forces and opposing rotation of the center shaft 34. The thrust washers 56,58,60 of the present invention are illustrated in FIG. 3. Upon rotation of the drive gear 30 in a line retrieving direction 92, the forward thrust 94 of the pinion gear 40 is met by the thrust washers 56,58,60. Because the coefficient of friction between the inner axially facing surfaces 70,74 of the end thrust washers 58,56, respectively, and the axially facing surfaces 66,68 of the middle thrust washer 60 is less than the coefficient of friction between the outer axially facing surfaces 72,76 of the end thrust washers 58,56, respectively, and the forwardly facing surface 54 of the pinion gear 40 and the rearwardly facing surface 52 of the OILITE TM bushing 46, slippage occurs between the thrust washers 56,58,60 and not between the OILITE TM bushing 46 and the pinion gear 40 or between the OILITE TM bushing 46 and the thrust washers 56,58,60. As a result, excessive heat build-up does not occur in the rearwardly facing surface 48 of the OILITE TM bushing 46 and therefore rapid depletion of the lubricant in the OILITE TM bushing does not occur. Therefore, line retrieval is smoother over the life of the reel 10 and premature failure of the reel 10 due to sticking between the OILITE TM bushing 46 and the pinion gear 40 is prevented.

Figure 6:
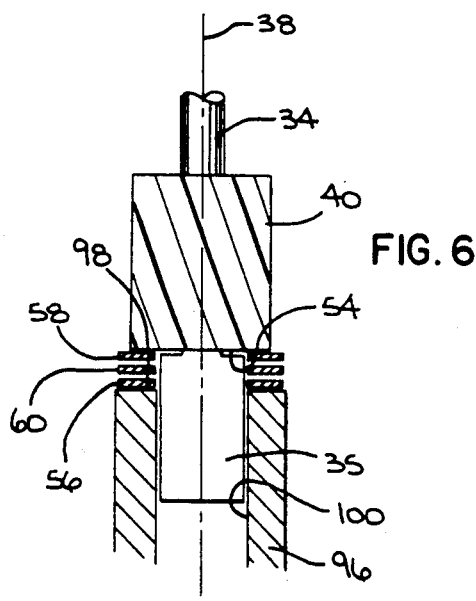
FIG. 6 is a cross-sectional view of the thrust washers of the present invention in combination with a bushing not having a limiting/confining structure according to the present invention and taken along line 6—6 of FIG. 3.
Figure 7:
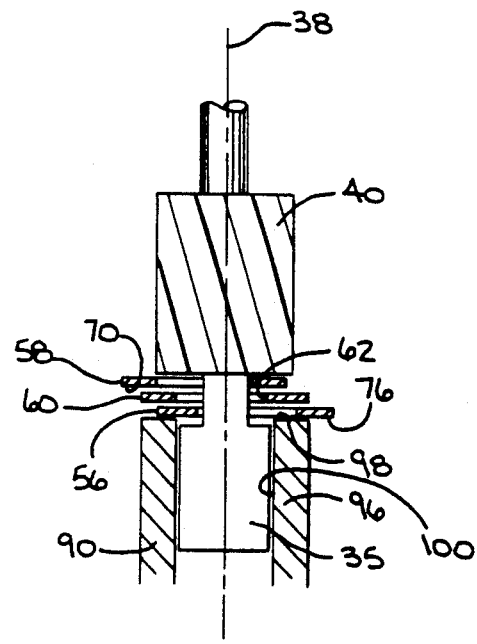
FIG. 7 is a view as in FIG. 6, illustrating the thrust washers in combination with a bushing not having a limiting/confining structure, the washers being in a radially unaligned position.

FIGS. 6 and 7 illustrate the shortcomings of using the thrust washers with a conventional bushing 96. The conventional bushing 96 lacks the radial lip 88 of the bushing 46 of the present invention. FIG. 6 illustrates the center shaft 34 when it is not pushed forward relative to the deck plate 12 by the thumb button 90. In this position, the thrust washers 56,58,60 radially surround the enlarged portion 35 of the center shaft 34. The thrust washer 58 abuts the forward facing surface 54 of the pinion gear 40 and the thrust washer 56 abuts the rearward facing edge 98 of the conventional bushing 90. When the thumb button 90 is depressed by a user, the center shaft 34 is pushed forward relative to the deck plate 12. Thus, the enlarged portion 35 of the center shaft 34 is pushed into the cylindrical bore 100 of the conventional bushing 90 as illustrated in FIG. 7. When the center shaft 34 is pushed forward in this manner, the thrust washers 56, 58 and 60 are no longer radially confined by their radially inwardly facing edges 62 abutting the enlarged portion 35 of the center shaft 34. Instead, the thrust washers 56,58,60 may move radially relative to the center shaft 34, as illustrated in FIG. 7. Thus, for example, the washer 58 may move radially so that its axial radial surface 70 extends radially relative to the axis 37 defined by the center shaft 34. Or, the axially radial surface 76 of the thrust washer 56 may similarly be radially displaced. When such radial displacement occurs, the thrust washers 56,68,60 may interfere with the axial movement of the center shaft 35 into a position abutting the pinion gear 40 when the thumb button 90 is released, thus preventing the reel 10 from returning to a line retrieval mode.

FIG. 8 illustrates the bushing 46 of the present invention which prevents the radial movement of the thrust washers 56,58,60. The radial lip 88 abuts the peripheral outer edges 61 of the thrust washers 56,58,60, thereby aligning their bores 63 around the periphery of the enlarged portion 35 of the center shaft 34. When the center shaft 34 is pushed forward by depression of the thumb button 90 by a user and the enlarged portion 35 is pushed forward and into the lesser diameter portion 84 of the bushing 46, as illustrated in FIG. 8, the radial movement of the thrust washers 56,58,60 is prevented, thereby preventing the thrust washers 56,58,60 from interfering with the enlarged portion 35 of the center shaft 34 returning to abutment with the pinion gear 40 when the thumb button 90 is released.

More particularly, the radially inwardly facing edges 62 of thrust washers 56,58,60 are prevented from hanging up on the corner 112 of the center shaft 34 defined between a shoulder/rearwardly facing surface 114 and peripheral outer surface 116 thereon. The thrust washers 56,58,60 and bushing are relatively dimensioned so that the edges 62 cannot radially overlap the corner 112.

The thrust washer structure of the present invention facilitates the use of an OILITE TM bushing in place of costly and delicate conventional or angular contact ball bearings. The thrust washer structure provides an inexpensive structure for minimizing frictional forces resisting rotation of the center shaft while the center shaft is under an axial load. Thus, the thrust bearing structure of the present invention facilitates smooth rotation of the center shaft even under axial loads and decreases wear on the reel gears, thereby extending the functional life of a fishing reel. The radial lip of the bushing of the present invention, used in combination with the thrust washers of the present invention, limits radial movement of the thrust washers, facilitating proper operation of the fishing reel.

I claim:

1. In a fishing reel having a deck plate, a center shaft extending forwardly through the deck plate and rotatable about a first axis, a pinion gear on the center shaft, a crank shaft rotatable about a second axis transverse to the first axis, and means for rotating the center shaft about the first axis as an incident of the crank shaft rotating about the second axis, the improvement comprising:
   a washer having a radially inwardly facing surface defining a bore for receiving the center shaft and a radially outwardly facing edge, the washer residing between the pinion gear and the deck plate,
   said center shaft having a reduced diameter portion and a second portion spaced axially with respect to the first axis from the reduced diameter portion and having a diameter that is greater than the diameter of the reduced diameter portion,
   the washer bore having a diameter that is greater than the diameter of the second portion to allow the washer to be slid axially with respect to the first axis over the second portion and;
   means on the deck plate radially outside of the center shaft bore in the washer and overlapping at least a part of the washer and the reduced diameter portion of the center shafts in a lengthwise direction relative to the center shaft for limiting shifting of the washer transverse to the first axis by engaging the radially outwardly facing edge of the washer and thereby preventing interference between the pinion gear and the center shaft during operation of the reel.

2. The improved fishing reel according to claim 1 wherein the pinion gear has a forwardly facing shoulder, the pinion gear has an outer surface defining a corner of the juncture between the pinion gear outer surface and the pinion gear shoulder, and the limiting means prevents the washer from shifting radially so that the radially inwardly facing edge on the washer extends radially outwardly relative to the pinion gear beyond the pinion gear corner.

3. The improved fishing reel according to claim 1 wherein the deck plate has a bushing thereon and the bushing defines the limiting means.

4. The improved fishing reel according to claim 3 wherein the bushing has a stepped inner surface having a greater diameter portion and a lesser diameter portion, the lesser diameter portion defining a center shaft abutting forward portion and the greater diameter portion defining a radially outwardly facing edge of the washer engaging rearward portion.

5. The improved fishing reel according to claim 1 wherein there are a plurality of stacked washers.

6. In a fishing feel having a deck plate, a center shaft extending forwardly through the deck plate and rotatable about a first axis, a pinion gear on the center shaft, and a crank shaft rotatable about a second axis transverse to the first axis as an incident of the crank shaft rotating about the second axis, the improvement comprising:

means for dissipating frictional forces caused by a forward thrust of the pinion gear, the dissipating means axially receiving the center shaft and residing between the pinion gear and the deck plate; and a bushing disposed between the deck plate and the center shaft, the bushing having a stepped inner surface including a greater diameter portion and a lesser diameter portion, said greater diameter portion residing radially outside of the center shaft and overlapping at least a part of the dissipating means in a lengthwise direction relative to the center shaft for limiting shifting of the dissipating means transverse to the first axis by engaging the dissipating means and thereby preventing interference between the bushing and the pinion gear during operation of the reel, said lesser diameter portion surrounding the center shaft and limiting relative movement between the bushing and center shaft radially relative to the first axis.

7. The improved fishing reel according to claim 6 wherein the dissipating means comprises a plurality of stacked washers.

8. An improved bushing for receiving and facilitating rotation of a center shaft in a fishing reel, the fishing reel having a deck plate with an axial bore therein, a center shaft extending forwardly through the axial bore in the deck plate, the center shaft being rotatable about a first axis, a bushing in the axial bore in the deck plate surrounding at last a part of the center shaft, a pinion gear on the center shaft, a crank shaft rotatable about a second axis transverse to the first axis, means for rotating the center shaft about the first axis as an incident of the crank shaft rotating about the second axis, and friction dissipating means surrounding the center shaft and residing between the pinion gear and a forwardly facing surface of the bushing, the bushing comprising:

a wall defining a peripheral outer surface received within an axial bore in the deck plate and a stepped inner surface having a greater diameter rearward portion and a lesser diameter forward portion, the lesser diameter portion abutting the center shaft and the greater diameter portion engaging the friction dissipating means to limit shifting of the dissipating means transverse to the first axis.

* * * * *